United States Patent
Ishiwata

[11] Patent Number: 5,892,641
[45] Date of Patent: *Apr. 6, 1999

[54] MAGNETORESISTIVE EFFECT HEAD WITH INDIVIDUAL LAYERS SATISFYING A BASIC INEQUALITY INVOLVING LAYER THICKNESS AND ION MILLING RATES

[75] Inventor: Nobuyuki Ishiwata, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 594,918

[22] Filed: Jan. 31, 1996

[30] Foreign Application Priority Data

Jan. 31, 1995 [JP] Japan .................................. 7-034273

[51] Int. Cl.$^6$ ........................................................ G11B 5/39
[52] U.S. Cl. ............................................................. 360/113
[58] Field of Search ..................................... 360/113, 126; 29/603.18; 216/22, 41

[56] References Cited

U.S. PATENT DOCUMENTS

| | | | |
|---|---|---|---|
| 4,036,638 | 7/1977 | Ray et al. ........................ | 75/123 B |
| 4,103,315 | 7/1978 | Hempstead et al. .................... | 360/110 |
| 4,825,325 | 4/1989 | Howard .................................. | 360/113 |
| 5,018,037 | 5/1991 | Krouni et al. ......................... | 360/113 |
| 5,258,884 | 11/1993 | Howard et al. ........................ | 360/113 |
| 5,408,377 | 4/1995 | Gurney et al. ......................... | 360/113 |
| 5,434,826 | 7/1995 | Ravipati et al. ........................ | 360/113 |
| 5,436,778 | 7/1995 | Lin et al. ................................ | 360/113 |
| 5,462,795 | 10/1995 | Shino et al. ............................ | 428/332 |
| 5,641,557 | 6/1997 | Ishiwata ................................. | 360/113 |
| 5,668,687 | 9/1997 | Chen et al. ............................ | 360/113 |

FOREIGN PATENT DOCUMENTS 3-125311   5/1991   Japan .

*Primary Examiner*—Jefferson Evans
*Attorney, Agent, or Firm*—Sughrue, Mion, Zinn, Macpeak & Seas, PLLC

[57] ABSTRACT

A central region susceptible to medium magnetic field is formed. End regions (13 to 15) sandwich and extend from the ends of the central region, and apply a vertical bias to the central region. These regions are formed on a substrate (1 to 5). The central region comprises a laminate layer having a SAL layer (5), a magnetic separation layer (6), a magnetoresistance layer (8), and an insulating layer (9), these layers being nearer the substrate in the mentioned order. The thicknesses of the individual layers, particularly the thickness of the insulating layer, are controlled to satisfy a relation of the thicknesses and ion milling rates of the layers given as:

$$(\delta_a/R_a)+(\delta_b/R_b)<(\delta_c/R_c)+(\delta_d/R_d)$$

where $\delta_a$ and $R_a$ are respectively thickness and ion milling rate of the horizontal bias layer, $\delta^b$ and $R_b$ are those of the magnetic separation layer, $\delta_c$ and $R_c$ are those of the magnetoresistance layer, and $\delta_d$ and $R_d$ are those of the insulating layer.

20 Claims, 6 Drawing Sheets

| ALUMINA LAYER THICKNESS | MILLING ANGLE | |
|---|---|---|
| | 10°<br>RESISTANCE INCREASE<br>(STANDARD DIFFERENCE) | 40°<br>RESISTANCE INCREASE<br>(STANDARD DIFFERENCE) |
| 10nm | +4.5Ω(2.0Ω) | +4.6Ω(2.2Ω) |
| 20nm | +1.1Ω(0.7Ω) | +3.9Ω(1.5Ω) |
| 30nm | +0.6Ω(0.5Ω) | +0.8Ω(0.6Ω) |

MAGNETORESISTIVE EFFECT HEAD WITH INDIVIDUAL LAYERS SATISFYING A BASIC INEQUALITY INVOLVING LAYER THICKNESS AND ION MILLING RATES

BACKGROUND OF THE INVENTION

The present invention relates to a magnetoresistive effect head and a method of manufacturing the same and, more particularly, to a magnetoresistive effect head employed for magnetic recorders and a method for manufacturing the same.

With a recent trend for size reduction and capacity increase of magnetic recorders, the magnetic recording techniques have a tendency of rapidly increasing integration density. Magnetic transducers utilizing magnetoresistance (MR) (hereinafter referred to as MR heads) can obtain a large reproduction output, and is one of the most important techniques for propelling the density increase of the magnetic recording. The MR head is dealt with in "A Magnetoresistive Readout Transducer", IEEE Trans. on Magn., MAG7 (1970) 150.

In the MR head, it is necessary to apply a domain control uni-directional magnetic field (i.e., vertical bias field) to a magnetoresistive (MR) effect film (mainly Ni—Fe film) as a region susceptible to medium magnetic field in order to prevent Barkhausen noise. U.S. Pat. No. 4,103,315 discloses a method of applying a vertical bias field across a magnetism-susceptible region of an Ni—Fe layer (film) serving as a magnetoresistive effect layer. In this technique, an antiferromagnetic layer such as an Fe—Ni layer is laminated on end portions of the magnetism-susceptible region to provide, as the vertical bias field, a uni-directional magnetic field provided by exchange coupling at the interface of the Ni—Fe layer and antiferromagnetic layer.

In the disclosed structure, the Ni—Fe layer is formed continuously to cover, as well as the magnetism-susceptible region, the domain control uni-directional magnetic field generating regions with the antiferromagnetic layer formed therein. Since the Ni—Fe layer in the magnetism-susceptible region is continuous to the Ni—Fe layer in the regions which are magnetized by the antiferromagnetic layer, with the vertical bias magnetic field applied to the magnetism-susceptible region and with the antiferromagnetic layer formed, the magnetization of the ends of the magnetism-susceptible region are fixed by the exchange coupling to result in reduction of the sensitivity to the medium magnetic field. In addition, the Ni—Fe layer and horizontal bias soft magnetic layer (SAL layer) located outside the magnetism-susceptible region are adversely affected by magnetic fluxes from tracks other than the read track to result in noise generation.

Japanese Patent Laid-Open Publication No. Heisei 3-125311 discloses a vertical bias application method for overcoming the above drawbacks. In the disclosed method, an Ni—Fe layer is formed in only a magnetism-susceptible region, and a soft magnetic layer is formed on opposite end portions of the Ni—Fe layer for magnetization to generate a uni-directional magnetic field, which is used for the vertical bias application to the magnetism-susceptible region.

However, in the Japanese Patent Laid-Open Publication No. Heisei 3-125311 structure noted above the magnetism-susceptible region which is a central region is joined in a very slant surface having a very small dimension to the permanent magnet layer formed at its opposite ends and also an electrode layer laminated on the permanent magnet layer, and the electrical connection in this juncture is insufficient, resulting an increase in resistance of the MR head.

In a process of patterning the central region as the magnetism-susceptible region and forming the vertical bias layer at the opposite ends of the central region, as shown in FIGS. 1(a), 1(b), 2(c) and 2(d), a photo-resist stencil pattern is formed (FIG. 1(a)), a central region is then patterned by slant ion milling (FIG. 1(b)), then the vertical bias layer is formed by sputtering (FIG. 2(c)), and then lift-off is made (FIG. 2(d)).

In this case, the magnetoresistive effect layer (MR layer) in the central region is usually hidden by a peak layer of the stencil mask, and the junction of the vertical bias layer and electrode layer that are formed as a result of round-about sputtering on the inner side of the stencil mask is found in difficult locality compared to the SAL layer or magnetic separation layer. The magnetoresistance layer is predominately low in resistance compared to the SAL layer or magnetic separation layer, and the difficulty of directly uniting the vertical bias layer or electrode layer to the magnetoresistance layer results in MR head resistance increase.

SUMMARY OF THE INVENTION

An object of the present invention is to facilitate the electrical junction in a slant surface as noted above, particularly direct union of the vertical bias layer or electrode layer to the magnetoresistance layer, thus permitting a low resistance MR head to be realized with a high yield.

According to the present invention, there is provided a magnetoresistive effect head comprising a central region susceptible to medium magnetic field and end regions sandwiching and extending from the opposite ends of the central region and for applying a vertical bias to the central region, these regions being formed on a substrate, the central region comprising a laminate layer having a soft magnetic layer for horizontal bias, a magnetic separation layer, a magnetoresistance layer and an insulating layer, these layers being near the substrate in the mentioned order, the thicknesses and ion milling rates of the individual layers satisfying a relation $$(\delta_a/R_a)+(\delta_b/R_b)<(\delta_c/R_c)+(\delta_d/R_d)$$

where $\delta_a$ and $R_a$ are respectively thickness and ion milling rate of the horizontal bias layer, $\delta_b$ and $R_b$ are those of the magnetic separation layer, $\delta_c$ and $R_c$ are those of the magnetoresistance layer, and $\delta_d$ and $R_d$ are those of the insulating layer.

According to another aspect of the present invention, there is provided a magnetoresistive effect head comprising a central region susceptible to medium magnetic field and end regions sandwiching and extending from the opposite ends of the central region and for applying a vertical bias to the central region, these regions being formed on a substrate, the central region comprising a laminate layer having a soft magnetic layer for horizontal bias, a magnetic separation layer, a magnetoresistance layer, a protection layer and an insulating layer, these layers being near the substrate in the mentioned order, the thicknesses and ion milling rates of the individual layers satisfying a relation $$(\delta_a/R_a)+(\delta_b/R_b)<(\delta_c/R_c)+(\delta_d/R_d)+(\delta_e/R_e)$$

where δa and Ra are respectively thickness and ion milling rate of the horizontal bias layer, δb and Rb are those-of the magnetic separation layer, δc and Rc are those of the magnetoresistance layer, δe and Re are those of the protective layer, and $\delta_d$ and $R_d$ are those of the insulating layer.

According to the present invention, there is provided a method of manufacturing the foregoing magnetoresistive effect head comprising a step of forming a laminate layer having a soft magnetic layer for horizontal bias, a magnetic separation layer, a magnetoresistance layer and an insulating layer by a physical vapor growth process on a substrate such that the element layers of the laminate layer are nearer the substrate in the mentioned order, a step of forming a photo-resist mask for forming the central region in the laminate layer, a step of patterning the laminate layer by ion milling, and a step of forming a magnetic layer structure for applying a vertical bias as the end regions by the vapor growth process.

Other objects and features will be clarified from the following description with reference to attached drawings.

DETAILED DESCRIPTION OF THE PREFERRED EMBODIMENTS

In the present invention, the individual layers of the laminate layer, i.e., the magnetic layer for horizontal bias, magnetic separation layer, magnetoresistance layer and insulating layer, are formed on the substrate. The ion milling rate is that of each layer of the laminate layer formed on the substrate, i.e., the soft magnetic layer for horizontal bias, magnetic separation layer, magnetoresistance layer or insulating layer. Generally, the ion milling rate is varied with the ion beam voltage and ion milling angle of each layer (i.e., incidence angle of the ion beam on each layer).

Figures 6, 7:
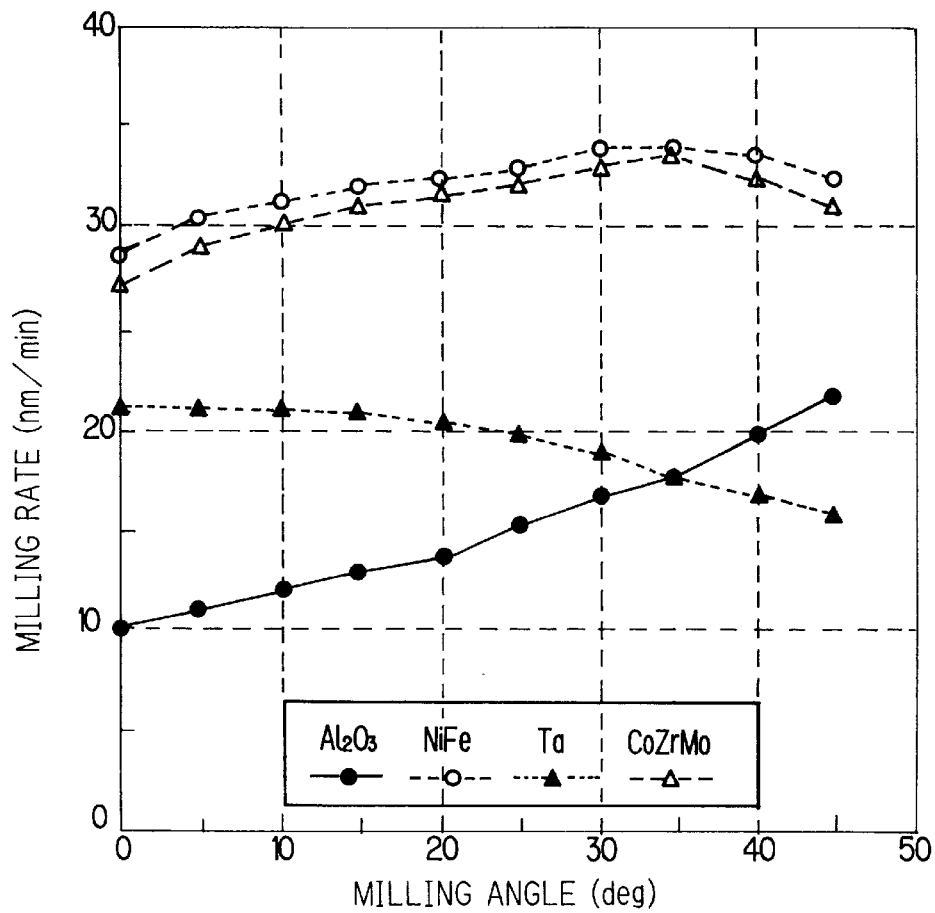
FIG. 6 shows an ion milling angle dependency of the ion milling rate of CoZrMo layer as horizontal bias layer, Ta layer as magnetic separation layer, and NiFe layer as magnetoresistance layer and alumina ($Al_2O_3$) layer as insulating layer.
FIG. 7 shows a table representing resistance increases from a design value and standard differences.

FIG. 6 shows an ion milling angle dependency of the ion milling rate of CoZrMo layer as horizontal bias layer, Ta layer as magnetic separation layer, and NiFe layer as magnetoresistance layer and alumina ($Al_2O_3$) layer as insulating layer. Ion beam voltage is 500 V. The ion milling rates of the CoZrMo layer and the NiFe layer are increased with increasing ion beam incidence angle and are maximum at an ion beam incidence angle of approximately 35 degrees. With the Ta layer the ion milling rate is substantially constant up to 20 degrees of the ion beam incidence angle and is reduced with further increase of the ion beam incidence angle. With the alumina layer the ion milling rate is increased with ion beam incidence angle.

Figure 5:
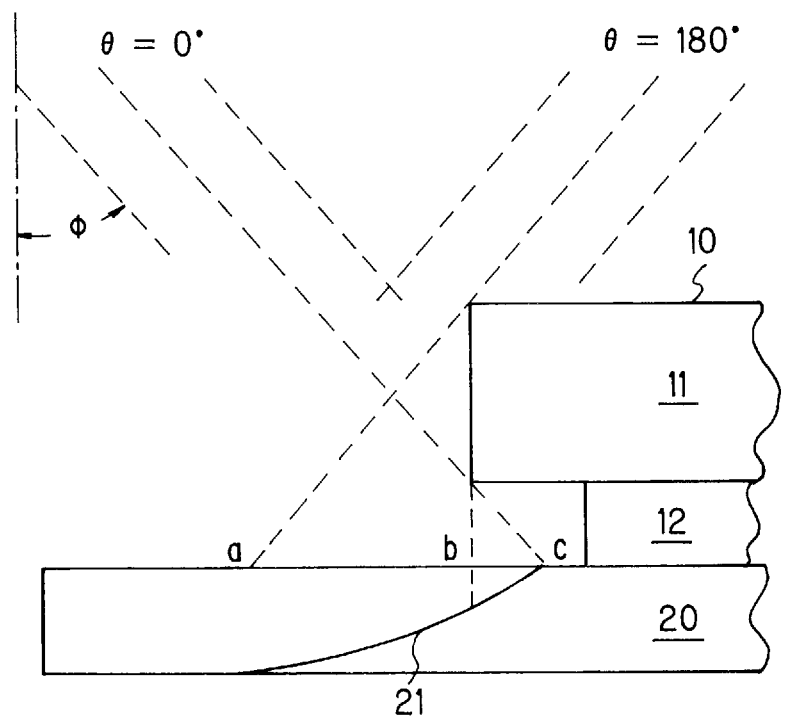
FIG. 5 shows a process of forming a photo-resist mask and ion milling patterning for the formation of the central region shape in the laminate layer.

A process of forming a photo-resist mask and ion milling patterning for the formation of the central region shape in the laminate layer, will be summarized with reference to FIG. 5.

Referring to FIG. 5, a stencil mask 10 is formed on a thin layer 20 in which a layer of an MR material or the like is laminated. The stencil mask 10 includes a thin stem layer 12 and a thick peak layer 11 having the role of focusing. The stem layer 12 is smaller in width than the peak layer 11. (Although not shown, the stencil mask 10 is substantially the same as the thin layer 20 in the dimension in the direction perpendicular to the plane of paper.) Labeled φ is the incidence angle of an ion milling beam (shown as dashed line) with respect to the substrate. Labeled θ is the azimuth angle with respect to the incident beam. Labeled a, b and c are limit points of exposure of the thin layer 20 to the ion milling beam with the peak layer 11 of the stencil mask 10. Labeled 21 is a surface along which the thin layer 20 is removed by the ion milling.

For the central region patterning by slant ion milling as shown in FIG. 5, the beam is caused to be incident on the substrate surface with incidence angle θ. The incidence angle θ is controlled by adequately tilting the substrate with respect to the incident beam. While the incident beam is tilted with respect to the substrate surface, the substrate is rotated. Causing rotation of the substrate while tilting the incident beam with respect to the substrate, has an effect of moving the beam's limit points of exposure by the peak layer 11 of the stencil mask 10.

In FIG. 5, in the region on the left side of the point a the incident beam is tilted toward the substrate surface, and that region is not masked by the peak layer 11 of the stencil mask 10 even with the rotation of the substrate. The region on the right side of the point c is prevented from exposure to the beam by the mask even with the tilting of the incident beam with respect to the substrate surface and also with the rotation of the substrate.

When the azimuth angle θ is 0 degree (i.e., at the start point), portion of the thin layer 20 on the left side of the point c is exposed. This exposure limit point is gradually moved to the left to eventually come to the point a, at which the azimuth angle θ is 180 degrees. By the slant ion milling in the above way, the thin layer 20 is removed along the surface 21. While the incident beam is shown with respect to a single direction for the brevity of description, the surface 21 which is formed as a result of the removal of the thin layer 20 is shown as a curved taper formed by composite milling.

The photo-resist mask has a width W1 in its portion nearer the laminate layer and a width W2 in its portion further from the laminate layer such that W1<W2. This means that with reference to FIG. 5 the thin lower stem layer 12 and the peak layer 11 of the stencil mask 10 have respective widths W1 and W2 such that W1<W2.

The incident angle of ions of the ion milling ranges from 0 degree to 30 degrees from a direction perpendicular to the layer surface of the central region. This means that with reference to FIG. 5 the incidence angle θ of the ion milling beam to the substrate ranges from 0 degree to 360 degrees.

The vapor growth process is, for instance, the sputtering process. In a step of forming, by the vapor growth process, a magnetic layer structure having a vertical bias function and serving as end regions, it is possible to eliminate burr generation by setting the sputtering gas pressure to be 3 mTorr or below.

An MR head is provided which has a central region susceptible to a medium magnetic field and end regions sandwiching and extending from opposite end faces of the central region and having a function of applying a vertical bias to the central region, these regions being formed on a ceramic substrate. In this MR head, the central region comprises a laminate layer including an SAL layer, a magnetic separation layer, a magnetoresistance layer, an insulating layer and, if necessary, a protective layer, these layers being nearer the substrate in the mentioned order. Appropriate control of the thicknesses of the layers, particularly the thickness of the insulating layer, such as to satisfy specific layer thickness and ion milling rate conditions, permits the magnetoresistance layer in the central region patterned by slant ion milling to be no longer hidden by the peak layer of the stencil mask. As a result, sufficient electric coupling of the sputtered vertical bias layer and electrode layer can be obtained to realize a low resistivity MR head.

An embodiment of the present invention will now be described with reference to the drawings. FIGS. 1(a), 1(b), 2(c) and 2(d) illustrate a process of patterning a central region as a magnetism susceptible region to form vertical bias regions at the opposite ends thereof.

First, the formation of a photo-resist pattern of a stencil shape as shown in FIG. 1(a) will be described. Using a highly hard composite ceramic composed of $Al_2O_3$ and TiC as the substrate 1, an about 10 µm alumina layer 2 was formed by sputtering and polishing to obtain surface smoothness. Then, after sufficient fat removal and washing a 2 µm Ni—Fe plating layer 3 was formed and patterned into a desired shape. Then, a 0.11 µm alumina insulating layer 4 was formed by sputtering.

On the wafer thus obtained a 30 nm CoZrMo layer as SAL layer 5, a 20 nm Ta layer as magnetic separation layer 6 and a 20 nm NiFe layer as magnetoresistance layer 7 were formed nearer the substrate from the substrate. A 5 nm Ta layer was further formed as protective layer 8 on the NiFe layer 20. The above structure was formed by continuous sputtering without breaking vacuum. An alumina insulating layer 9 for prescribing the track width was further formed by sputtering. Cases of setting the thickness of the alumina insulating layer 9 of 10 nm, 20 nm and 30 nm will be described later in connection with FIGS. 3 and 4.

Stencil mask 10 as shown in FIG. 1(a) was formed on the above laminate layer. The stencil mask 10 was formed by setting the width of its peak layer 11 to 1 µm, 2 µm, 3 µm and 4 µm. Here, the differences of the width do not give rise to any function or effect difference. The thickness of the peak layer 11 was set to 1 µm. The stem layer 12 was less in width by 0.7 µm than the peak layer 11, and its height was set to 0.3 µm.

Slant ion milling of the central region as shown in FIG. 1(b) will now be described. The central region was patterned by the slant ion milling while rotating the substrate. The ion milling beam incidence angle was set to 10 degrees and 40 degrees to the normal to the laminate layer surface.

The shape of end portions of the central region patterned by ion milling is varied in relation to the ion milling rate at each ion milling angle of the individual layers, i.e., the CoZrMo layer as the SAL layer 5, Ta layer as the magnetic separation layer 6, NiFe layer as the magnetoresistance layer 7, Ta layer as the protective layer 8 and alumina insulating layer 9 for track width prescription.

Figure 3:
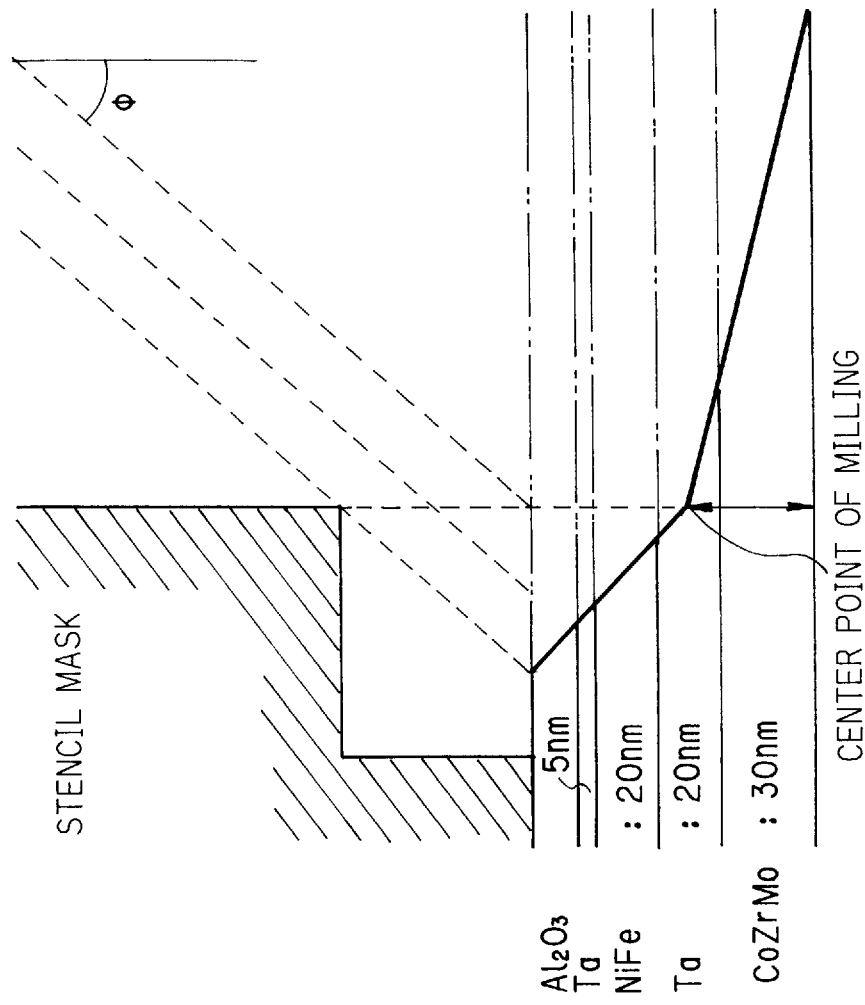
FIG. 3 shows a center point of ion milling of the laminate layer constituting region.
Figure 4:
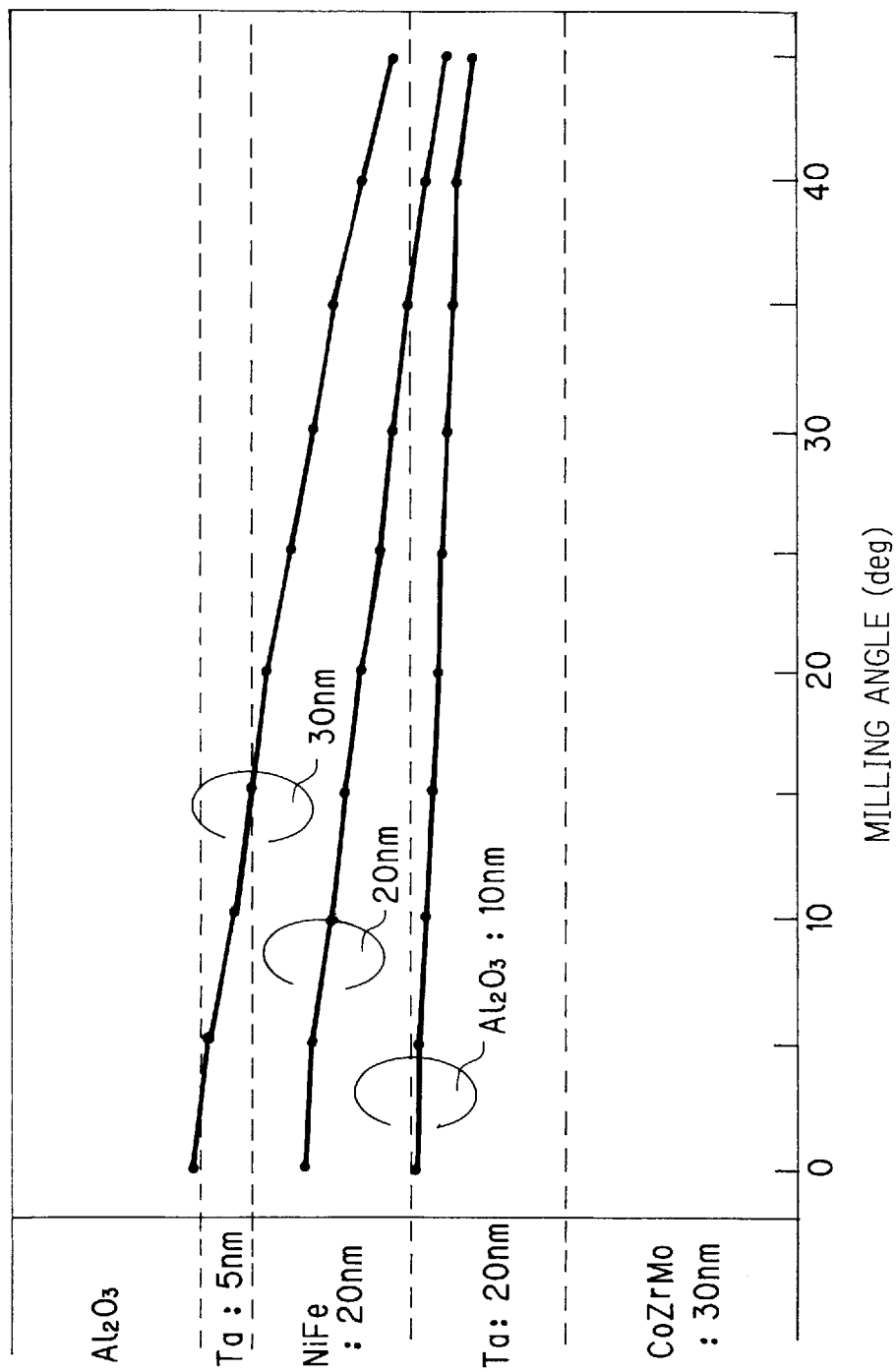
FIG. 4 shows locations of the ion milling center point in the laminate layer structure shown in FIG. 3.

FIG. 3 shows the center point of ion milling of the laminate layer constituting region, and FIG. 4 shows how the ion milling center point varies according to the ion milling angle and the thickness of the track width prescription (alumina) insulating layer. Specifically, FIG. 3 shows a laminate layer comprising a 30 nm CoZrMo layer as the SAL layer, a 20 nm Ta layer as the magnetic separation layer, a 20 nm NiFe layer as the magnetoresistance layer, a 5 nm Ta layer as the protective layer and a track width prescription alumina insulating layer, these layers being formed on a substrate such that they are nearer the substrate in the mentioned order. Also shown are a stencil mask for ion milling, incidence angle θ of ions (i.e., ion milling angle in degree) and center point of ion milling.

In the graph of FIG. 4, the ordinate is taken for the lamination of the 30 nm CoZrMo layer, 20 nm Ta layer, 20 nm NiFe layer, 5 nm Ta layer and alumina insulating layer, and the abscissa is taken for the ion milling angle (in degrees). The shape of end portions of the central region patterned by the ion milling, is varied in relation to the ion milling rate at each ion milling angle of the individual layers. That is, the center point of ion milling as shown in FIG. 3 is varied by varying the thickness of alumina up to the uppermost surface and the ion milling angle. The portion of the layer above the ion milling center point is hidden by the stencil mask peak layer, while the portion therebelow is exposed by the peak portion. The variation of the ion milling center point with the ion milling angle, i.e., with the incidence angle θ, is attributable to the variation of the ion milling rate of each layer with the ion milling angle.

FIG. 4 shows the location of the ion milling center point in the laminate layer structure shown in FIG. 3. As shown in FIGS. 3 and 4, the condition under which the magnetoresistance layer in the central region patterned in the slant ion milling step as shown in FIG. 1(b) is not hidden by the stencil mask peak layer, is found from the variation of the shape of the end portions of the patterned central region in relation to the ion milling rate of each layer at each ion milling angle.

In this embodiment, the CoZrMo, Ta, NiFe and Ta layers formed in the mentioned order are respectively 30, 20, 20 and 5 nm in thickness, and by controlling $\delta_{Al}$ such that:

$$(20/R_{NiFe})+(5/R_{Ta})+(\delta_{Al}/R_{Al})>(30/R_{CoZrMo}+20/R_{Ta})$$

where $R_{CoZrMo}$, $R_{Ta}$, $R_{NiFe}$ and $R_{Al}$ are the ion milling rates of the CoZrMo, Ta, NiFe and $Al_2O_3$ layers, the NiFe layer is not hidden but is exposed by the stencil mask.

In this case, the ion milling rates $R_{CoZrMo}$, $R_{Ta}$, $R_{NiFe}$ and $R_{Al}$ at ion beam incidence angles of 10 and 40 degrees were 30 and 34 nm/min., 21 and 17 nm/min., 32 and 37 nm/min. and 12 and 20 nm/min., respectively.

As shown in FIGS. 3 and 4, with the alumina layer thickness of 10 nm the NiFe layer was hidden by the stencil mask peak layer at both the ion milling angles of 10 and 40 degrees. With the alumina layer thickness of 20 nm, the NiFe layer was exposed by the peak layer at the ion milling angle of 10 degrees and hidden by the peak layer at the ion milling angle of 40 degrees. With the alumina thickness of 30 nm the NiFe layer was exposed at both the ion milling angles of 10 and 40 degrees.

Subsequently, a vertical bias layer is formed by sputtering. End regions were formed by sputtering on the FIG. 1(b) structure obtained by the slant ion milling. Specifically, a 10 nm Cr layer was formed as a ground layer 13 of magnetic field application layer, a 25 nm CoCrPt layer was formed as a vertical bias magnetic field layer 14, and a 100 nm Ta layer was formed as an electrode layer 15.

Figure 2:
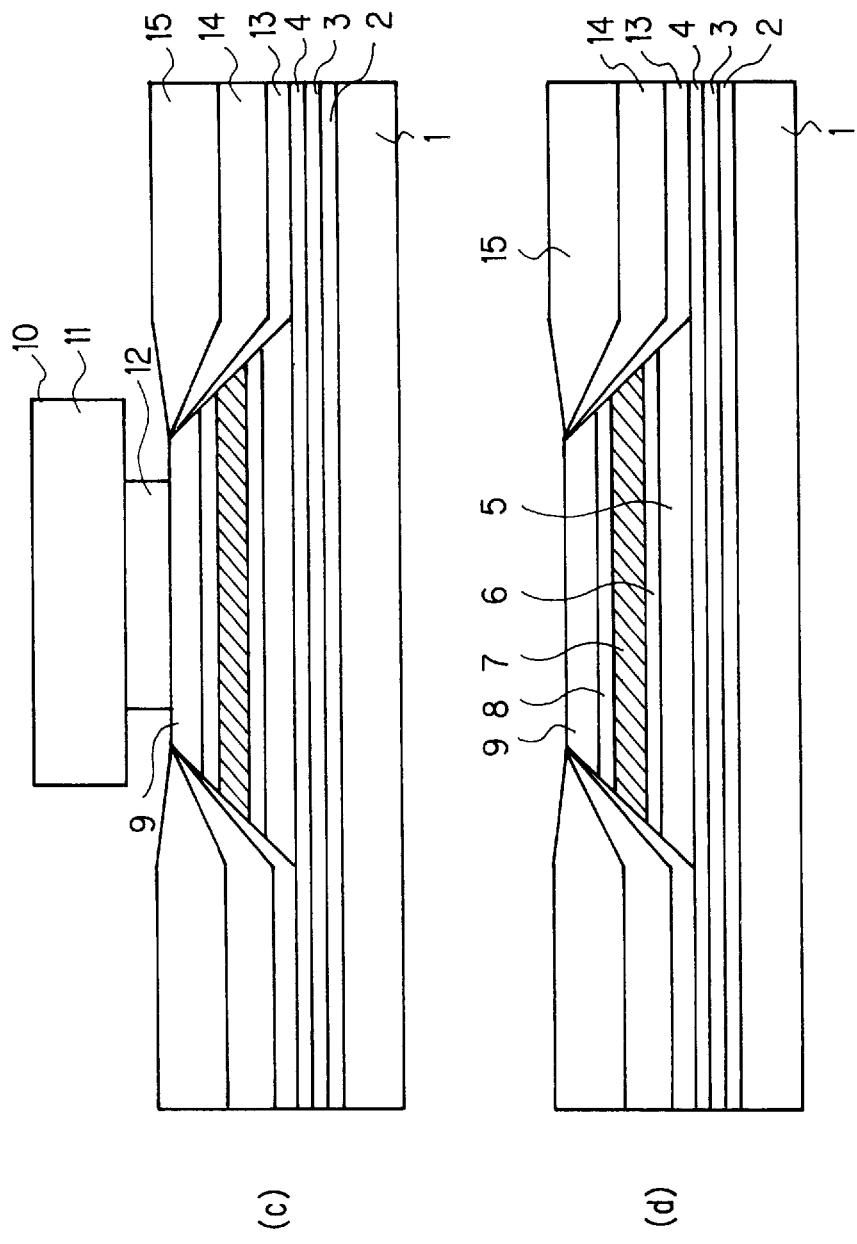

In order to prevent burr generation due to formation of a sputtered layer on the stencil mask stem layer by roundabout deposition of sputtered particles, it is necessary to enhance the directivity of sputtered particles. In the embodiment, the sputtering gas pressure was set to 3 Mtorr or below. By setting the sputtering gas pressure to 3 mTorr or below, the burr generation could be eliminated. Subsequently, lift-off process was made to obtain a desired element as shown in FIG. 2(d). Afterwards, a metal electrode was laminated on the Ta electrode for connection to an external electrode. Then, a 0.14 μm alumina layer was formed by sputtering, and then a 2 μm NiFe layer was formed by the frame plating process.

In the above way a reproducing portion of a shield type MR head was formed, and a usual thin layer head was formed as a head for the sole recording on this portion. Results of measurements of the element resistance of the above embodiment of the MR head are shown in FIG. 7.

FIG. 7 shows a table representing resistance increases from a design value and standard differences. As is seen from FIG. 7, with an alumina layer thickness of 20 nm and an ion milling angle of 10 degrees as the conditions assuring that the NiFe layer in the central region is not hidden by the stencil mask peak layer, the resistance increase and fluctuation are small with an alumina layer thickness of 30 nm and ion milling angles of 10 and 40 degrees.

Figure 1:
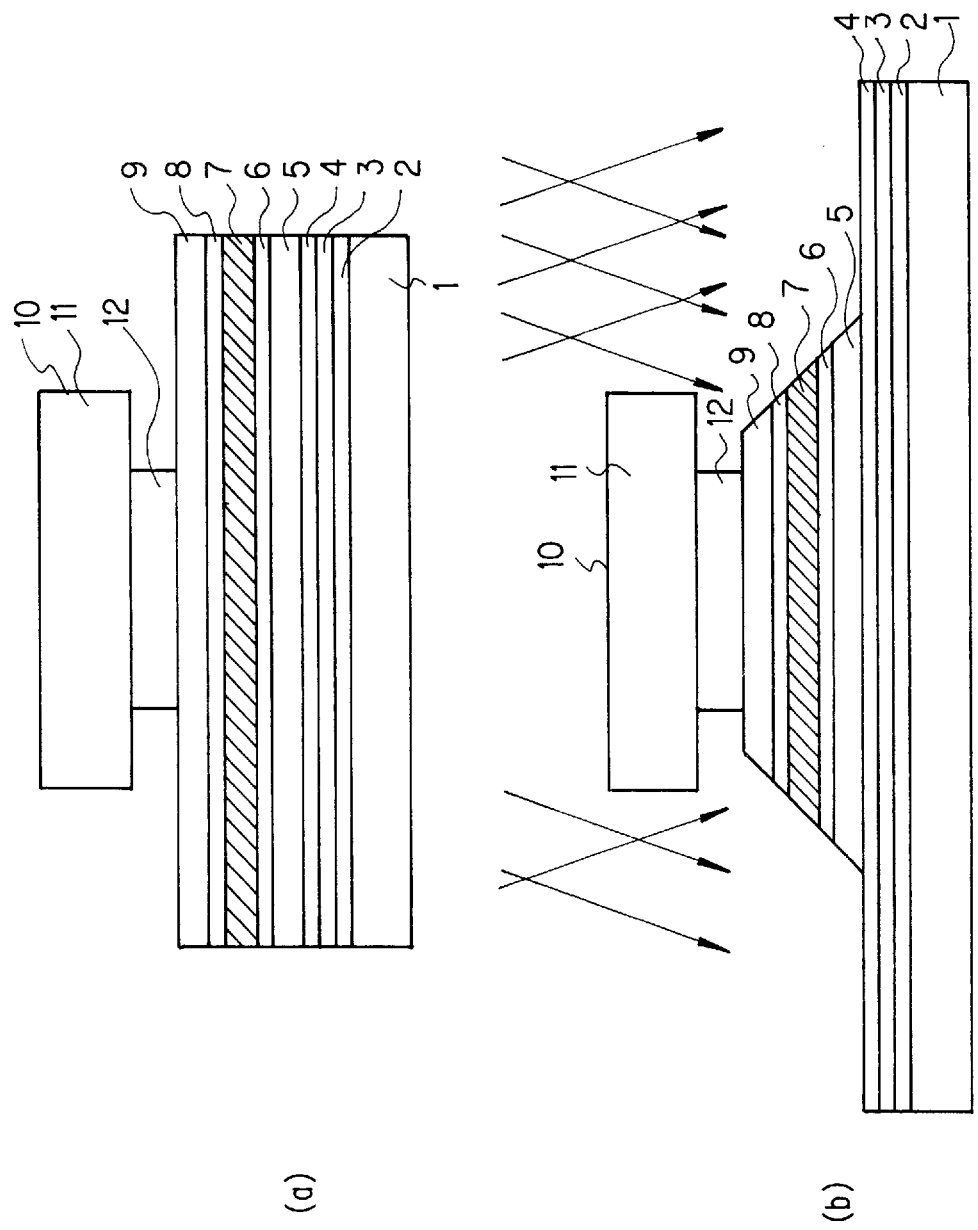
FIGS. 1(a), 1(b), 2(c) and 2(d) illustrate a process of patterning a central region as a magnetism susceptible region to form vertical bias regions at the opposite ends thereof.

In the layer constituting the central region in FIG. 1, the protective layer 8 can be dispensed with when the track width prescription alumina layer 9 is formed such that it is continuous to other layers. Again in this case, an MR head of low resistance and small resistance fluctuations is obtainable by controlling the alumina layer thickness such that the NiFe layer is not hidden by the stencil mask peak portion.

Even where the SAL layer 5 comprises a metal represented by Co—M (M representing at least one element selected from the group consisting of Ti, V, Cr, Mn, Fe, Ni, Y, Zr, Nb, Mo, Hf, Ta, W, Ru, Rh, Pd and Pt) or Ni—Fe—M (M representing by at least one element selected from the same group), an MR head with low resistance and small resistance fluctuations can be obtained through control of the thicknesses of the individual layers, i.e., the SAL, magnetic separation, MR, protective and insulating layers, particularly the thickness of the insulating layer, such as to satisfy a relation of the thicknesses and ion milling rates of the layers to one another given as:

$$(\delta_a/R_a)+(\delta_b/R_b)<(\delta_c/R_c)+(\delta_d/R_d)+(\delta_e/R_e)$$

where $\delta_a$ and $R_a$ are respectively the thickness and ion milling rate of the horizontal bias layer, $\delta_b$ and $R_b$ are those of the magnetic separation layer, $\delta_c$ and $R_c$ are those of the magnetoresistance layer, $\delta_e$ and $R_e$ are those of the protective layer, and $\delta_d$ and $R_d$ are those of the insulating layer.

Even where the magnetic separation layer 6 comprises at least one element selected from the group consisting of Ti, V, Cr, Mn, Y, Zr, Nb, Mo, Hf, Ta, W, Ru, Rh, Pd and Pt, an MR head with low resistance and small resistance fluctuations can be obtained through control of the thicknesses of the individual layers, i.e., the SAL, magnetic separation, MR, protective and insulating layers, particularly the thickness of the insulating layers, such as to satisfy a relation of the thicknesses and ion milling rates of the layers to one another given as:

$$(\delta_a/R_a)+(\delta_b/R_b)<(\delta_c/R_c)+(\delta_d/R_d)+(\delta_e/R_e)$$

where $\delta_a$ and $R_a$ are respectively the thickness and ion milling rate of the horizontal bias layer, $\delta_b$ and $R_b$ are those of the magnetic separation layer, $\delta_c$ and $R_c$ are those of the magnetoresistance layer, $\delta_e$ and $R_e$ are those of the protective layer, and $\delta_d$ and $R_d$ are those of the insulating layer.

Even where the magnetoresistance layer 7 comprises Ni—Fe—Co, an MR head with low resistance and small resistance fluctuations can be obtained through control of the thicknesses of the individual layers, i.e., the SAL, magnetic separation, MR, protective and insulating layers, particularly the thickness of the insulating layer, such as to satisfy a relation of the thicknesses and ion milling rates of the layers to one another given as:

$$(\delta_a/R_a)+(\delta_b/R_b)<(\delta_c/R_c)+(\delta_d/R_d)+(\delta_e/R_e)$$

where $\delta_a$ and $R_a$ are respectively the thickness and ion milling rate of the horizontal bias layer, $\delta_b$ and $R_b$ are those of the magnetic separation layer, $\delta_c$ and $R_c$ are those of the magnetoresistance layer, $\delta_e$ and $R_e$ are those of the protective layer, and $\delta_d$ and $R_d$ are those of the insulating layer.

Even where the protective layer 8 is a thin layer comprising at least one element selected from the group consisting of Ti, V, Cr, Mn, Y, Zr, Mo, Hf, Ta, W, Ru, Rh, Pd and Pt, an MR head with low resistance and small resistance fluctuations can be obtained through control of the thickness of the individual layers, i.e., the SAL, magnetic separation, MR, protective and insulating layers, particularly the thickness of the insulating layer, such as to satisfy a relation of the thicknesses and ion milling rates of the layers to one another given as:

$$(\delta_a/R_a)+(\delta_b/R_b)<(\delta_c/R_c)+(\delta_d/R_d)+(\delta_e/R_e)$$

where $\delta_a$ and $R_a$ are respectively the thickness and ion milling rate of the horizontal bias layer, $\delta_b$ and $R_b$ are those of the magnetic separation layer, $\delta_c$ and $R_c$ are those of the magnetoresistance layer, $\delta_e$ and $R_e$ are those of the protective layer, and $\delta_d$ and $R_d$ are those of the insulating layer.

Even where the insulating layer is other than an alumina layer and comprises an oxide or nitride, an MR head with low resistance and small resistance fluctuations can be obtained through control of the thickness of the individual layers, i.e., the SAL, magnetic separation, MR, protective and insulating layers, particularly the thickness of the insulating layer, such as to satisfy a relation of the thicknesses and ion milling rates of the layers to one another given as:

$$(\delta_a/R_a)+(\delta_b/R_b)<(\delta_c/R_c)+(\delta_d/R_d)+(\delta_e/R_e)$$

where $\delta_a$ and $R_a$ are respectively the thickness and ion milling rate of the horizontal bias layer, $\delta_b$ and $R_b$ are those of the magnetic separation layer, $\delta_c$ and $R_c$ are those of the magnetoresistance layer, $\delta_e$ and $R_e$ are those of the protective layer, and $\delta_d$ and $R_d$ are those of the insulating layer.

Even where the end regions to apply a vertical bias magnetic field to the central region have a structure including a permanent magnet layer mainly composed of Co other than CoCrPt, for instance CoPt, CoCrTa and CoNiCr, an MR head with low resistance and small resistance fluctuations can be obtained through control of the thicknesses of the individual layers, i.e., the SAL, magnetic separation, MR protective and insulating layers, particularly the thickness of the insulating layer, such as to satisfy a relation of the thicknesses and ion milling rates of the layers to one another given as:

$$(\delta_a/R_a)+(\delta_b/R_b)<(\delta_c/R_c)+(\delta_d/R_d)+(\delta_e/R_e)$$

where $\delta_a$ and $R_a$ are respectively the thickness and ion milling rate of the horizontal bias layer, $\delta_b$ and $R_b$ are those of the magnetic separation layer, $\delta_c$ and $R_c$ are those of the magnetoresistance layer, $\delta_e$ and $R_e$ are those of the protective layer, and δd and Rd are those of the insulating layer.

Even where the end regions to apply a vertical bias to the central region have a structure including a laminate layer having a thin layer comprising an alloy containing Mn—M (M being at least one element selected from the group consisting of Fe, Co and Ni), or an oxide containing M including at least one of Ni, Fe and Co, or a rare earth metal or Ni—Fe—M (M being at least one element selected from the group consisting of Co, Ti, V, Cr, Mn, Y, Zr, Nb, Mo, Hf, Ta, W, Ru, Rh, Pd and Pt), an MR head with low resistance and small resistance fluctuations can be obtained through control of the thicknesses of the individual layers, i.e., the SAL, magnetic separation, MR, protective and insulating layers, particularly the thickness of the insulating layer, such as to satisfy a relation of the thicknesses and ion milling rates of the layers to one another given as:

$$(\delta_a/R_a)+(\delta_b/R_b)<(\delta_c/R_c)+(\delta_d/R_d)+(\delta_e/R_e)$$

where $\delta_a$ and $R_a$ are respectively the thickness and ion milling rate of the horizontal bias layer, $\delta_b$ and $R_b$ are those of the magnetic separation layer, $\delta_c$ and $R_c$ are those of the magnetoresistance layer, $\delta_e$ and $R_e$ are those of the protective layer, and $\delta_d$ and $R_d$ are those of the insulating layer.

As has been described in the foregoing, the present invention facilitates the coupling of a vertical bias layer and electrode layer of an MR head to a magnetoresistance layer to realize a low resistance MR head with a high yield, and with the MR head according to the present invention having a patterned central region susceptible to medium magnetic field and end regions on the opposite sides of the central region and to apply a vertical bias thereto, it is possible to reduce the resistance and resistance fluctuations of the element. It is thus possible to avoid the magnetoresistance layer in the patterned central region from being hidden by the peak layer of the stencil mask. Sufficient electric coupling of the spattered vertical bias layer and electrode layer thus can be obtained to realize a low resistance MR head.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A magnetoresistive effect head comprising a central region susceptible to medium magnetic field and end regions sandwiching and extending from the opposite ends of the central region and for applying a vertical bias to the central region, these regions being formed on a substrate, the central region comprising a laminate layer having a soft magnetic layer for horizontal bias, a magnetic separation layer, a magnetoresistance layer, and an insulating layer, these layers being parallel and near the substrate in the mentioned order so that the laminate layer is disposed closer to the substrate than the other layers and the insulating layer is disposed farther from the substrate than the other layers, the thicknesses and ion milling rates of the individual layers satisfying a relation $$(\delta_a/R_a)+(\delta_b/R_b)<(\delta_c/R_c)+(\delta_d/R_d)$$

where $\delta_a$ and $R_a$ are respectively thickness and ion milling rate of the horizontal bias layer, $\delta_b$ and $R_b$ are those of the magnetic separation layer, $\delta_c$ and $R_c$ are those of the magnetoresistance layer, and $\delta_d$ and $R_d$ are those of the insulating layer.

2. The magnetoresistive effect head according to claim 1, wherein the soft magnetic layer for horizontal bias comprises a metal represented by Co—M, M being at least one element selected from the group consisting of Ti, V, Cr, Mn, Fe, Ni, Y, Zr, Nb, Hf, Ta, W, Ru, Rh, Pd and Pt.

3. The magnetoresistive effect head according to claim 1, wherein the soft magnetic layer for horizontal bias comprises a metal represented by Ni—Fe—M, M being at least one element selected from the group consisting of Ti, V, Cr, Y, Zr, Nb, Mo, Hf, Ta, W, Ru, Rh, Pd and Pt.

4. The magnetoresistive effect head according to claim 1, wherein the magnetic separation layer comprises at least one member of the group consisting of Ti, V, Cr, Mn, Y, Zr, Nb, Mo, Hf, Ta, W, Ru, Rh, Pd and Pt.

5. The magnetoresistive effect head according to claim 1, wherein the magnetoresistance layer comprises a member of the group consisting of Ni—Fe and Ni—Fe—Co.

6. The magnetoresistive effect head according to claim 1, wherein the end region for applying a vertical bias to the central region include a permanent magnet layer mainly composed of Co.

7. The magnetoresistive effect head according to claim 1, wherein each of the end regions for applying a vertical bias to the central region include a laminate layer having a thin layer, wherein said thin layer comprises at least one of the following:
   (a) an alloy containing Mn—M, M being at least one element selected from the group consisting of Fe, Co and Ni, or an oxide containing M comprising at least one member of the group consisting of Ni, Fe and Co,
   (b) a rare earth metal, and
   (c) Ni—Fe or Ni—Fe—M, M being at least one element selected from the group consisting of Co, Ti, V, Cr, Mn, Y, Zr, Nb, Mo, Hf, Ta, W, Ru, Rh, Pd and Pt.

8. A method of manufacturing the magnetoresistive effect head according to claim 1 comprising a step of forming a laminate layer having a soft magnetic layer for horizontal bias, a magnetic separation layer, a magnetoresistance layer and an insulating layer by a physical vapor growth process on a substrate such that the element layers of the laminate layer are nearer the substrate in the mentioned order, a step of forming a photo-resist mask for forming the central region in the laminate layer, a step of patterning the laminate layer by ion milling, and a step of forming a magnetic layer structure for applying a vertical bias to the end regions by the vapor growth process.

9. The process of manufacturing the magnetoresistive effect head according to claim 8, wherein in the step of forming the photo-resist mask for forming the shape of the central region in the laminate layer the width of the photo-resist mask is set to W1 for a portion nearer the laminate layer and W2 for a portion remoter from the laminate layer.

10. The method of manufacturing the magnetoresistive effect head according to claim 8, wherein in the step of forming the shape of the central region by ion milling the incidence angle of ions of the ion milling is set in a range of 0 degree to 30 degrees to the normal to the layer surface of the central region.

11. The process of manufacturing the magnetoresistive effect head according to claim 8, wherein the step of forming the magnetic layer structure for applying a vertical bias to the end regions adopts the vapor growth precess.

12. The method of manufacturing the magnetoresistive effect head according to claim 8, wherein the vapor phase growth process is carried out under a pressure of 3 mTorr or below.

13. A magnetoresistive effect head comprising a central region susceptible to medium magnetic field and end regions sandwiching and extending from the opposite ends of the central region and for applying a vertical bias to the central region, these regions being formed on a substrate, the central region comprising a laminate layer having a soft magnetic layer for horizontal bias, a magnetic separation layer, a magnetoresistance layer, a protective layer and an insulating layer, these layers being parallel and near the substrate in the mentioned order so that the laminate layer is disposed closer to the substrate than the other layers and the insulating layer is disposed farther from the substrate than the other layers, the thicknesses and ion milling rates of the individual layers satisfying a relation $$(\delta_a/R_a)+(\delta_b/R_b)<(\delta_c/R_c)+(\delta_d/R_d)+(\delta_e/R_e)$$

where $\delta_a$ and $R_a$ are respectively thickness and ion milling rate of the horizontal bias layer, $\delta_b$ and $R_b$ are those of the magnetic separation layer, $\delta_c$ and $R_c$ are those of the magnetoresistance layer, $\delta_e$ and $R_e$ are those of the protective layer, and $\delta_d$ and $R_d$ are those of the insulating layer.

14. The magnetoresistive effect head according to claim 13, wherein the soft magnetic layer for horizontal bias comprises a metal represented by Co—M, M being at least one element selected from the group consisting of Ti, V, Cr, Mn, Fe, Ni, Y, Zr, Nb, Hf, Ta, W, Ru, Rh, Pd and Pt.

15. The magnetoresistive effect head according to claim 13, wherein the soft magnetic layer for horizontal bias comprises a metal represented by Ni—Fe—M, M being at least one element selected from the group consisting of Ti, V, Cr, Y, Zr, Nb, Mo, Hf, Ta, W, Ru, Rh, Pd and Pt.

16. The magnetoresistive effect head according to claim 13, wherein the magnetic separation layer comprises at least one member of the group consisting of Ti, V, Cr, Mn, Y, Zr, Nb, Mo, Hf, Ta, W, Ru, Rh, Pd and Pt.

17. The magnetoresistive effect head according to claim 13, wherein the magnetoresistance layer comprises a member of the group consisting of Ni—Fe and Ni—Fe—Co.

18. The magnetoresistive effect head according to claim 13, wherein the end region for applying a vertical bias to the central region include a permanent magnet layer mainly composed of Co.

19. The magnetoresistive effect head according to claim 13, wherein each of the end regions for applying a vertical bias to the central region include a laminate layer having a thin layer, wherein said thin layer comprises at least one of the following:
(a) an alloy containing Mn—M, M being at least one element selected from the group consisting of Fe, Co and Ni, or an oxide containing M comprising at least one member of the group consisting of Ni, Fe and Co,
(b) a rare earth metal, and
(c) Ni—Fe or Ni—Fe—M, M being at least one element selected from the group consisting of Co, Ti, V, Cr, Mn, Y, Zr, Nb, Mo, Hf, Ta, W, Ru, Rh, Pd and Pt.

20. The magnetoresistive effect head according to claim 13, wherein the protective layer comprises at least one element selected from the group consisting of Ti, V, Cr, Mn, Y, Zr, Nb, Mo, Hf, Ta, W, Ru, Rh, Pd and Pt.

* * * * *

UNITED STATES PATENT AND TRADEMARK OFFICE
CERTIFICATE OF CORRECTION

PATENT NO. : 5,892,641
DATED : April 6, 1999
INVENTOR(S) : Nobuyuki ISHIWATA

It is certified that error appears in the above-indentified patent and that said Letters Patent is hereby corrected as shown below:

Column 2, line 64, delete "$\delta$e and Re" and insert --$\delta_e$ and $R_e$--;

Column 4, lines 15 and 16, delete "$\theta$" and insert --$\phi$--;

Column 6, line 2, delete "$\theta$" and insert --$\phi$--;

Column 6, line 18, delete "$\theta$" and insert --$\phi$--.

Signed and Sealed this

Twenty-third Day of November, 1999

Q. TODD DICKINSON

Attest:

Attesting Officer

Acting Commissioner of Patents and Trademarks